(12) United States Patent
Gust

(10) Patent No.: US 6,773,776 B2
(45) Date of Patent: Aug. 10, 2004

(54) COMPONENTS HAVING ENHANCED ADHESION BETWEEN PARTS

(75) Inventor: Herbert Gust, Ludwigsburg (DE)

(73) Assignee: KACO GmbH & Co., Heilbronn (DE)

( * ) Notice: Subject to any disclaimer, the term of this patent is extended or adjusted under 35 U.S.C. 154(b) by 0 days.

(21) Appl. No.: 09/130,593

(22) Filed: Aug. 7, 1998

(65) Prior Publication Data

US 2001/0051237 A1 Dec. 13, 2001

(30) Foreign Application Priority Data

Aug. 8, 1997 (DE) .......................................... 197 34 330

(51) Int. Cl.⁷ .............................................. C23C 16/00
(52) U.S. Cl. ...................... 428/36.9; 277/602; 277/603; 277/608; 277/628; 277/632; 277/647; 277/648; 277/650; 277/653; 277/654; 428/36.91; 428/66.4
(58) Field of Search ................................ 277/602, 603, 277/608, 628, 632, 647, 648, 650, 653, 654; 428/35.7, 36.9, 36.91, 66.4

(56) References Cited

U.S. PATENT DOCUMENTS

| | | | |
|---|---|---|---|
| 5,693,236 A | * 12/1997 | Okumura et al. | ............... 216/7 |
| 5,874,170 A | * 2/1999 | Heine et al. | ................. 428/422 |
| 5,958,532 A | * 9/1999 | Krause et al. | ............. 428/36.3 |
| 6,538,084 B2 | * 3/2003 | Kitahara et al. | ............. 526/250 |

FOREIGN PATENT DOCUMENTS

EP 551094 A1 * 7/1993

* cited by examiner

Primary Examiner—Sandra M. Nolan
(74) Attorney, Agent, or Firm—Gudrun E. Huckett

(57) ABSTRACT

A component having at least one support member with a first connecting portion and at least one part with a second connecting portion is formed by activating the second connecting portion by plasma treatment and then combining the first and second connecting portions and securing their attachment to one another by a heat and pressure treatment.

16 Claims, 3 Drawing Sheets

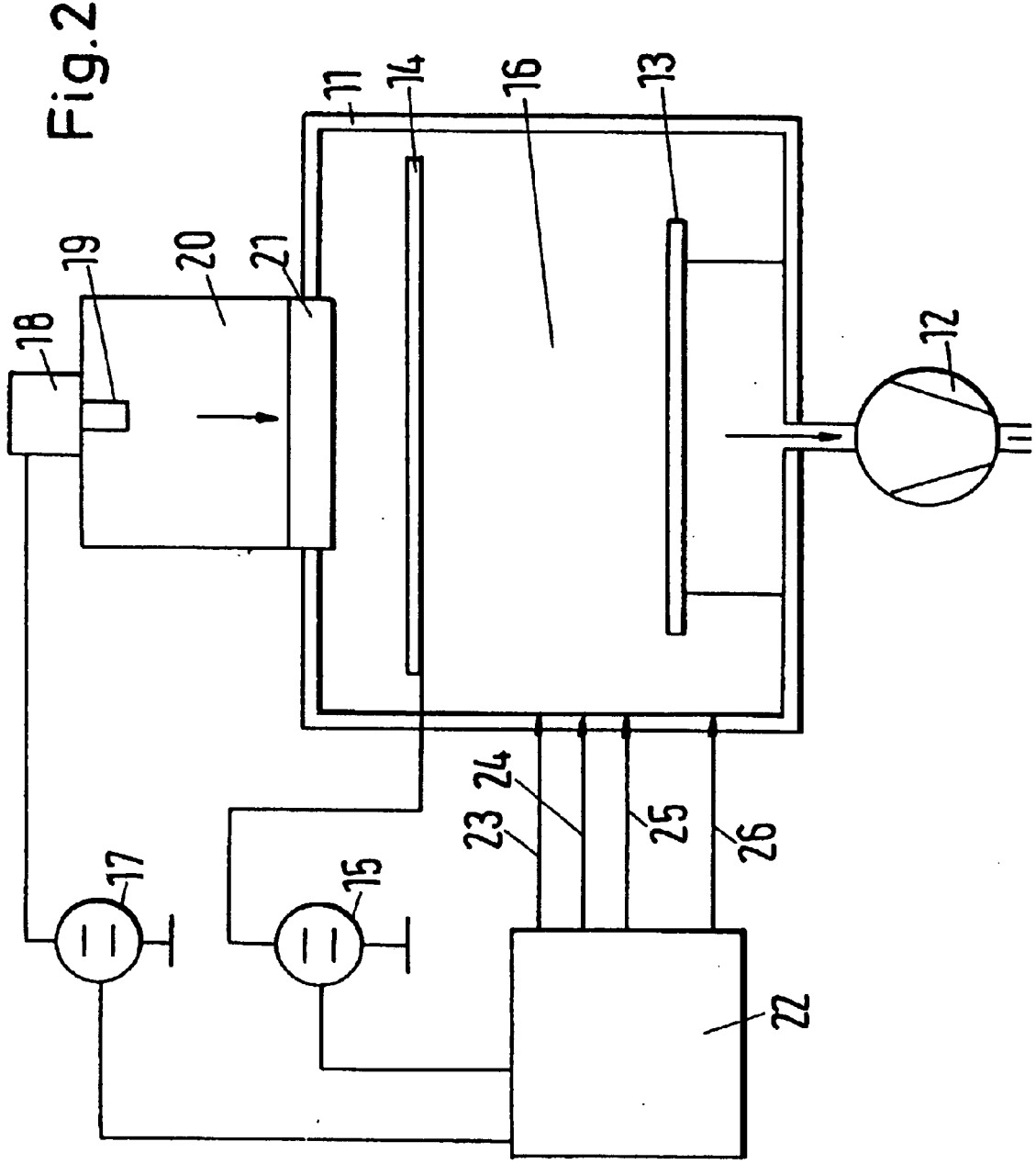

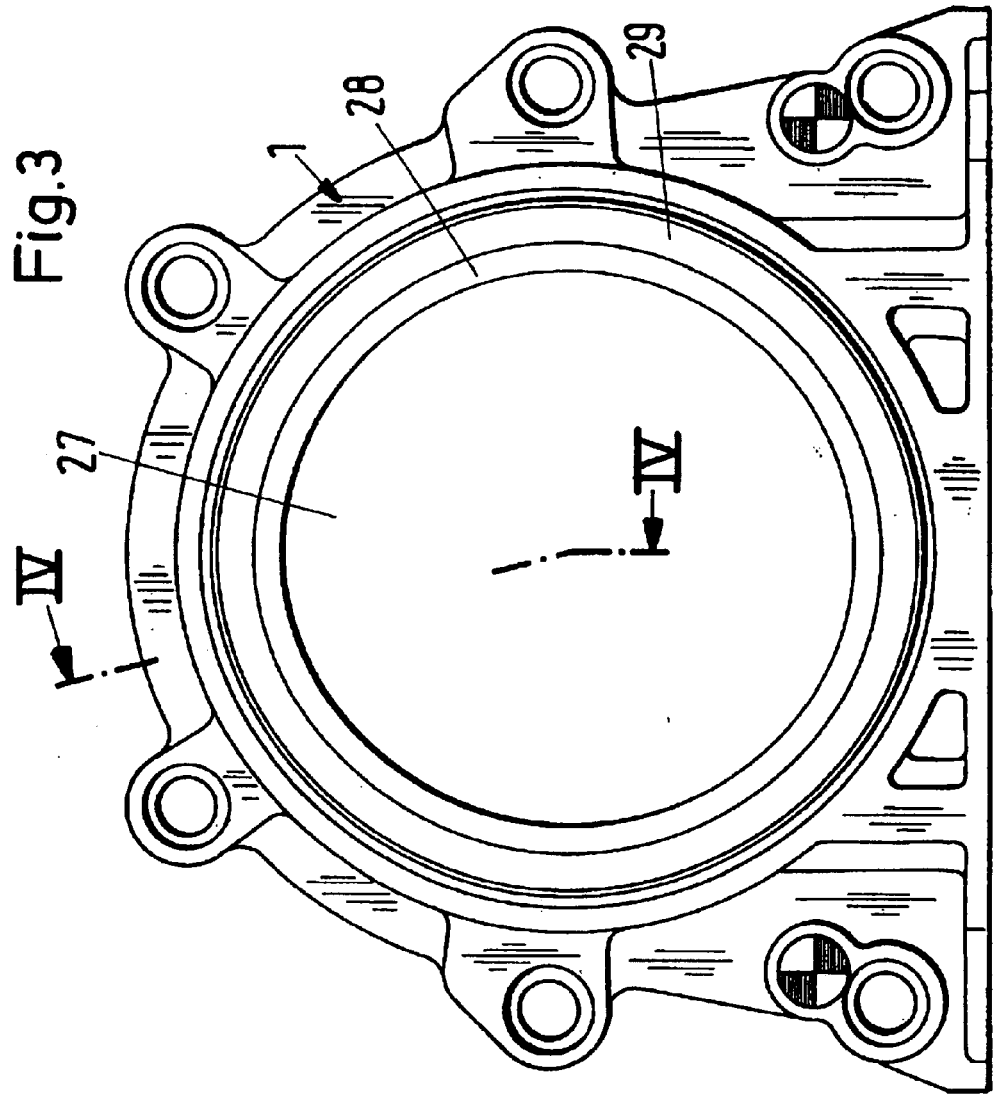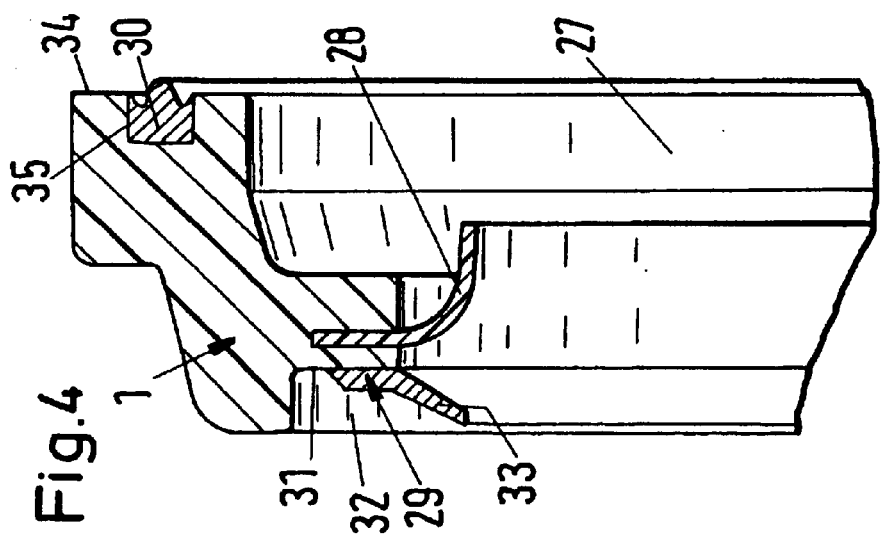

COMPONENTS HAVING ENHANCED ADHESION BETWEEN PARTS

BACKGROUND OF THE INVENTION

The invention relates to a component comprised of at least one support member and at least one part connected thereto whereby at least the connecting portion of the part connected to the support member consists of poly fluorocarbon. The invention also relates to a method for manufacturing a connection between a support member and a part of such a component in which at least the connecting portion of the part connected to the support member consists of poly fluorocarbon.

Support members in the form of support bodies are known for sealing rings having sealing elements consisting of poly-fluorocarbon, especially of polytetrafluoroethylene. The sealing element is etched in the connecting area by liquid ammonia or a solution of polyanyl and alkali metals in ether. The etched sealing element is then placed into a mold into which the polymer material is filled that combines with the etched portion of the sealing element to form a sealing ring. This wet-chemical etching method is complicated and also causes considerable environmental problems.

Sealing rings are known in which the surface of the sealing element consisting of polytetrafluoroethylene has introduced therein a small amount of the plastic material of the support body or a component that is compatible therewith. The chemical and material-bonded connection is then carried out by melting the pretreated sealing element to the support body during the injection molding process. The introduction of the plastic component into the surface of the sealing element is complicated and makes the manufacture of the sealing ring very expensive.

It is therefore an object of the present invention of embody the component and the method of the aforementioned kind such that the component and the connection can be produced in a simple manner, inexpensively, and without causing environmental problems.

SUMMARY OF THE INVENTION

The object in regard to the component of the aforementioned kind is inventively solved in that the connection between the support member and the part connected thereto, at least in the area of the connecting portion, is activated by plasma treatment. In the aforementioned method the object is inventively solved by activating at least the connecting portion of the part at its surface by plasma treatment and by fixedly connecting the activated surface of the connecting portion with pressure and/or heat treatment to the support member.

At least the connecting portion of the part that is provided for fastening to the support member is treated by plasma treatment. This plasma treatment results in a micro-sandblasting effect (plasma etching) and/or in chemical changes in the micro area at the surface of the connecting portion of the part. The plasma-activated surface of the connecting portion ensures in a surprisingly simple manner that the part can be reliably and fixedly connected to the support member without requiring etching processes with solvents or solutions. The plasma treatment is environmentally friendly and requires no solutions or solvents that are difficult to discharge so that the otherwise required conventional methods for avoiding environmental problems are eliminated. The support member with the part attached thereto can be produced in a simple manner. It is possible to connect the plasma-treated part directly or with use of a bonding agent in the form of an intermediate layer to the support member.

BRIEF DESCRIPTION OF THE DRAWINGS

The object and advantages of the present invention will appear more clearly from the following specification in conjunction with the accompanying drawings in which:

FIG. 2 shows in a schematic representation a plasma device for treatment of parts of the component of FIG. 1;

FIG. 3 shows a view of a second embodiment of the inventive component;

FIG. 4 shows an enlarge detail of a section along the line IV—IV of FIG. 3.

DESCRIPTION OF PREFERRED EMBODIMENTS

Figure 1:
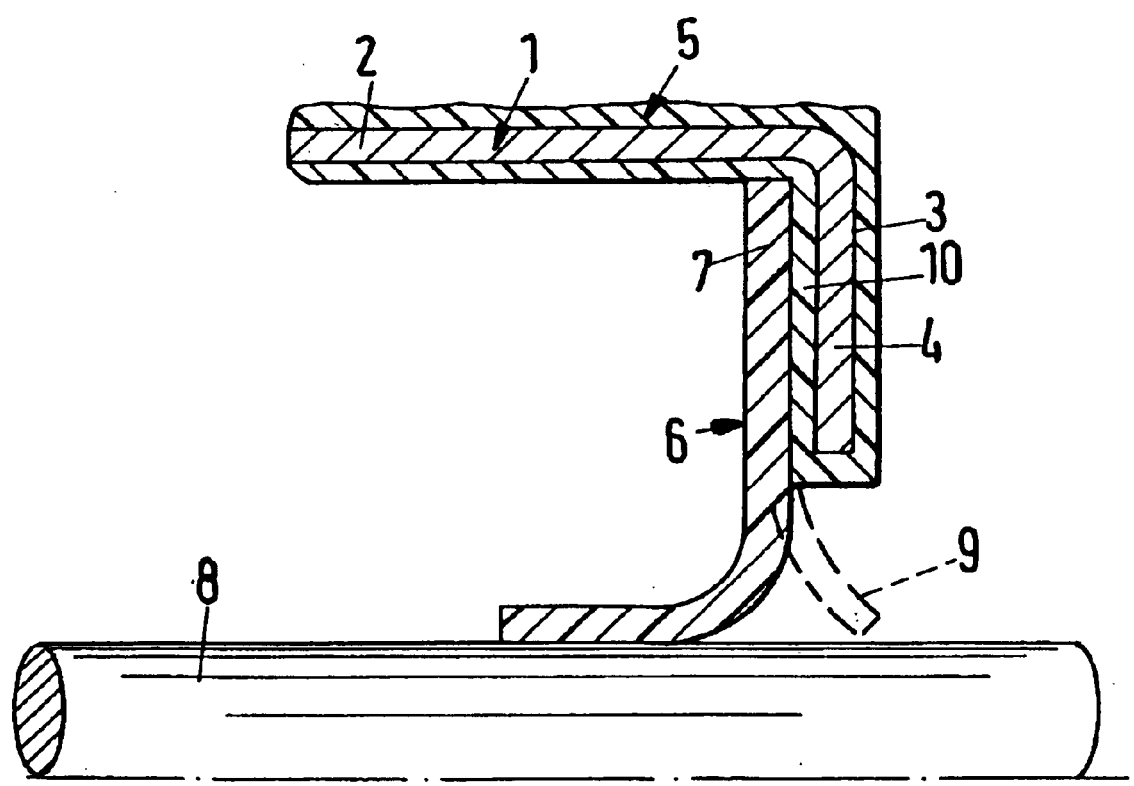
FIG. 1 shows an axial section one half of a support member with a part consisting of poly-fluorocarbon attached thereto, whereby the support member and the part belong to a component that is inventively embodied as a sealing ring.

The present invention will now described in detail with the aid of several specific embodiments utilizing FIGS. 1 through 4.

With the aid of FIGS. 1 and 2 a sealing ring is disclosed as the inventive component. The support member and the part connected thereto can be embodied in any other suitable manner. For example, the component may be a bearing housing having glide surfaces comprised of poly fluorocarbon and having a housing mantle that is, for example, comprised of a thermoplastic material. It is only important in the context of the present invention that the part with its connecting portion is activated by plasma treatment in order to ensure the connection between it and the support member. The support member can be a unitary part made of plastic material such as a thermoplastic material, a thermosetting material or an elastomer. However, it is also possible to produce only the connecting portion for the poly fluorocarbon part to be attached to the support member from such a plastic material and to produce other portions of the support member of any other suitable material, for example, metal. It is also possible to produce the entire support member of metal.

FIG. 1 shows only in a exemplary manner a sealing ring which comprises a cup-shaped support body 1 which is comprised of metallic material, of a hard plastic material etc. The cylindrical mantle 2 as well as the exterior side 3 of the bottom 4 of the support body 1 are partly covered by a cover or coating 5. In the shown embodiment the cover 5 covers the entire exterior side of the cylindrical mantle 2 and also the exterior side of the bottom 4. Depending on the application, it is, of course, also possible to cover only a part of the exterior side of the cylindrical mantle 2 and/or a part of the exterior side 3 of the bottom 4 with a cover or coating 5. The cover 5 positioned on the exterior side of the cylindrical mantle 2 can also be separate from the cover provided at the exterior side 3 of the bottom 4. The cover in the shown embodiment covers also the inner side of the cylindrical mantle 2 and of the bottom 4. In this case it is also possible to cover with the cover 5 only a portion of the inner side of the cylindrical mantle and/or of the bottom 4. The cover 5 is comprised of an elastomeric material.

The sealing ring is provided with a sealing element 6 that is comprised of poly fluorocarbon. The poly fluorocarbons to be used in the context of the invention may be homo polymers, especially polytetrafluoroethylene but also poly vinylidene fluoride, polyvinyl fluoride etc. Poly fluorocarbon can also be used in the form of a copolymer, for example, poly fluoro ethylene-propylene, vinylidene fluoride-hexa fluoro propylene copolymer, ethylene-tetra fluoroethylenecopolymer, perfluoroalkoxyalkane copolymer etc. These poly fluorocarbon materials exhibit very high chemical resistance even at increased temperatures and are harmless with regard to physiological aspects, are not flammable or flame resistant and have excellent gliding and anti adhesion properties. Of the aforementioned homo polymers especially polytetrafluoroethylene is suitable as a sealing element 6 for the sealing ring.

The sealing element 6 has a connecting portion 7 which in the shown embodiment is positioned radially relative to the axis of the shaft 8 to be sealed, but may be positioned at any suitable angle to the axis of the shaft. The radially inwardly positioned area of the disc-shaped sealing element 6 is bent and rests sealingly at the shaft 8.

As indicated by a dashed line in FIG. 1, the sealing element 6 can be provided with a dust lip 9 which is formed by radially slotting the radially inner area of the sealing element 6. Of course, in this case the sealing element 6 is thicker than represented in FIG. 1.

The connecting portion 7 is used to fixedly connect the sealing element 6 to the inner side of the bottom 4 of the support member 1, i.e., to the part 10 of the cover 5. This connection, as will be disclosed in the following in more detail, is achieved without use of wet-chemical etching of the connecting portion 7 of the sealing element 6. The connection between the sealing element 6 consisting of poly fluorocarbon and the connecting portion of the cover 5 consisting of elastomer material is effected by a plasma treatment of the connecting portion 7 of the sealing element 6. The plasma treatment activates the surface of the connecting portion 7 which abuts the cover portion 10 so that it can be fixedly connected to the elastomer material of the connecting portion 10 of the cover 5. With the plasma activation it is also possible to connect the connecting portion 7 of the sealing element 6 with an adhesive to the connecting portion 10 of the cover 5 or directly to the support body 1. It is no longer necessary to introduce into the upper side of the connecting portions 7 of the sealing element 6 such material parts which allow for a material-bonded connection to the elastomer material of the connecting portion 10 of the cover 5. The plasma treatment eliminates the use of additives, respectively, the need for embedding of certain materials into the upper side of the connecting portion 7.

FIG. 2 shows in a schematic representation a plasma device in which the surface of the sealing element 6, at least in the area of the connecting portion 7, is surface-activated, whereby the sealing element 6 is comprised of poly fluorocarbon. The plasma device has a chamber 11 in which the plasma treatment of sealing elements 6 is carried out. In the interior of the chamber 11 vacuum is produced by a vacuum pump 12. When a pressure of approximately 0.1 to 1 mbar is provided, a processing gas is introduced into the interior of the chamber 11.

A support 13 is positioned in the chamber 11 onto which the poly fluorocarbon sealing element 6 can be placed for plasma treatment. Above the support 13 and the sealing elements to be treated an antenna 14 is positioned within the chamber which is connected to a high frequency generator 15 positioned outside the chamber. The high frequency generator 15 supplies frequencies within the KHz and MHz range. The high frequency generator 15 and the antenna 14 ionize the process gas within the receiving chamber so that a plasma 16 results.

The energy required for ionization of the process gas can also be introduced, alternatively or in addition, by microwave devices. The plasma device is then provided with a microwave power supply 17 that is positioned exterior to the chamber 11 and connected to the magnetron 18. An antenna 19 is provided thereat and extends into a hollow guide 20. The magnetron 18 is a diode oscillator which oscillates at a fixed frequency. The antenna 19 of the magnetron 18 is not positioned within the vacuum of the chamber 11. A glass window 21 separates the chamber 11 from the magnetron 18 and the antenna 19 via which the microwave radiation is introduced into the chamber 11.

The high frequency generator 15 and the microwave power supply 17 are connected to a control unit 22 which also controls the supply of processing gases via line 23, the supply of a flushing gas via line 24, venting via line 25 as well as pressure measurement via line 26.

For the plasma treatment of poly fluorocarbon sealing elements 6, which are positioned within the receiving chamber 11 on the support 13, the vacuum is generated in the aforementioned manner by the vacuum pump 12. As soon as the desired vacuum has been reached, the control unit 22 is activated, and via line 23 the process gas is introduced into the receiving chamber 11. For producing the plasma 16 energy in the form of high frequency radiation is needed so that the process gas can be ionized. For this purpose, the high frequency generator 15 is controlled by the control unit 22 so that via the antenna 14 the high frequency radiation is introduced into the process gas.

Pressure within the receiving chamber 11 can be measured via the line 26 by employing the control unit 22. The energy-rich plasma activates the side of the sealing element 6 facing the antenna 14. With a respective design of the support 13 and of the antenna 14 it is also possible to provide for a general activation of the sealing element 6. The treatment period of the sealing element 6 is advantageously between one minute and approximately 30 minutes.

A flushing gas is introduced via line 24 into the receiving chamber 11. Upon completion of the plasma treatment of the sealing element 6 the line 25 can be used for venting the interior of the receiving chamber 11.

The process gases may be, for example, air, oxygen, argon, nitrogen, hydrogen, tetrafluoromethane or mixtures thereof.

The thus plasma-treated sealing element 6 is then connected in a conventional manner in a vulcanization mold to the elastomer material of the cover 5. Due to the plasma treatment a wet-chemical etching of the sealing element 6, respectively, its connecting portions 7 is no longer required. This also eliminates the environmental problems resulting from chemical etching. Also, it is no longer necessary to introduce into the surface of the sealing element 6 or of the connecting portion 7 plastic components or materials which allow for a material-bonded connection between the cover 5 and the part.

The plasma treatment of the sealing elements 6 can be controlled, in addition to selecting the type of process gas and the amount of vacuum generated, by the shape of the antenna 14 and/or its output.

The sealing elements 6 contain in addition to the polyfluorocarbon compound, of course, further components or substrates such as, for example, fillers and additives as they are known in connection with sealing elements made of polytetrafluoroethylene.

The sealing elements 6, after pretreatment as disclosed, can be directly connected to the support member 1 when the support member is comprised of plastic material. For this purpose, the plastic body 1 can be connected permanently, for example, as a plastic melt, in the manufacturing process (injection molding) directly to the plasma activated poly fluorocarbon part 6.

The support 1 (FIGS. 3 and 4) may also be a flange for sealing the crankshaft of an automobile. The flange 1 is comprised of a thermoplastic material, such as poly phenylene sulfide, and has a circular through opening 27 for the crankshaft. In this through opening 27 a sealing ring 28 consisting of poly fluorocarbon, especially polytetrafluoroethylene, is arranged which seals relative to the crankshaft. This sealing ring 28 is connected in the aforementioned manner by plasma treatment to the flange 1. In order to combine with the flange 1 further sealing rings 29, 30 which are not comprised of poly fluorocarbon, the flange 1 is subjected to plasma treatment when it has anti-adhesive properties for the material of further (auxiliary) seals 29, 30. They are comprised substantially of elastomeric material but can also be comprised of thermoplastic material. After plasma treatment the further seals 29, 30 are connected in a manner known per se to the flange 1. The plasma treatment of the flange 1 no longer makes it necessary to employ bonding agents for connecting thereto the further sealing rings 29, 30. Of course, it is possible to use a bonding agent. The further sealing 29 is an annular ring (O ring) which is fastened at the bottom 31 of a depression 32 at the end face of the flange 1 and extends with the sealing lip 33 inwardly into the through opening 27. At the opposite end face 34 of the flange 1 an annular groove 35 positioned coaxially to the through opening 27 has connected thereto a static seal 30 which projects past the end face 34. The seal 30 is effective after screwing the flange 1 to a housing part and provides a sealing action between the flange and the housing part.

The specification incorporates by reference the disclosure of German priority document 197 34 330.9 of Aug. 8, 1997.

The present invention is, of course, in no way restricted to the specific disclosure of the specification and drawings, but also encompasses any modifications within the scope of the appended claims.

What is claimed is:

1. A component comprising at least one support member having a first connecting portion and at least one part having a second connecting portion, wherein said second connecting portion is connected to said first connecting portion, wherein for achieving a permanent adhesive connection between at least said second connecting portion and said first connecting portion, said second connecting portion of said at least one part is comprised of poly-fluorocarbon, wherein a surface of at least said second connecting portion is activated by plasma activation to form a plasma-activated surface for connecting said at least one support member and said at least one part, wherein said plasma-activated surface is plasma-etched by a micro sand-blasting effect caused by the plasma activation in a micro area.

2. A component according to claim 1, wherein said at least one support member and said connecting portion are connected without an intermediate bonding agent layer.

3. A component according to claim 1, wherein said poly-fluorocarbon is a homo polymer.

4. A component according to claim 1, wherein said poly-fluorocarbon is polytetrafluoroethylene or poly (vinylidene fluoride) or poly (vinyl fluoride).

5. A component according to claim 1, wherein said poly-fluorocarbon is a copolymer containing at least one fluorocarbon monomer.

6. A component according to claim 5, wherein said copolymer is fluoroethylene-propylene copolymer or by vinylidene fluoride-hexafluoropropylene copolymer or ethylene-tetrafluoroethylene copolymer or perfluoro alkoxyalkane copolymer.

7. A component according to claim 1, wherein at least said first connecting portion of said at least one support member consists of plastic material.

8. A component according to claim 7, wherein said plastic material is a thermoplastic material or a thermoset plastic material or an elastomer.

9. A component according to claim 8, wherein said plastic material is poly (phenylene sulfide) and wherein said at least one support member is activated by plasma treatment.

10. A component according to claim 1, wherein said at least one support member supports a sealing ring.

11. A component according to claim 10, wherein said at least one support member is cup-shaped.

12. A component according to claim 1, wherein said at least one part is a sealing element of a sealing ring.

13. A component according to claim 1, wherein said at least one support member comprises at least one elastomer element.

14. A component according to claim 1, wherein said at least one elastomer element is said first connecting portion.

15. A component according to claim 14, wherein said at least one elastomer encloses said at least one support member at least partially.

16. A component according to claim 1, wherein said at least one part contains additives.

* * * * *